Figure 13:
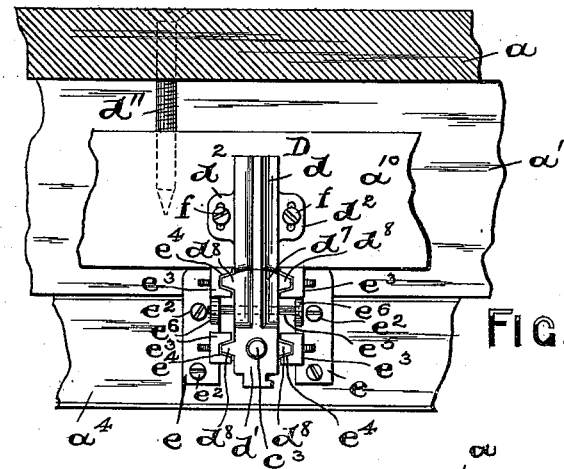

No. 641,842. Patented Jan. 23, 1900.
S. S. COLT.
DOOR.
(Application filed Aug. 5, 1899.)
(No Model.) 3 Sheets—Sheet 1.
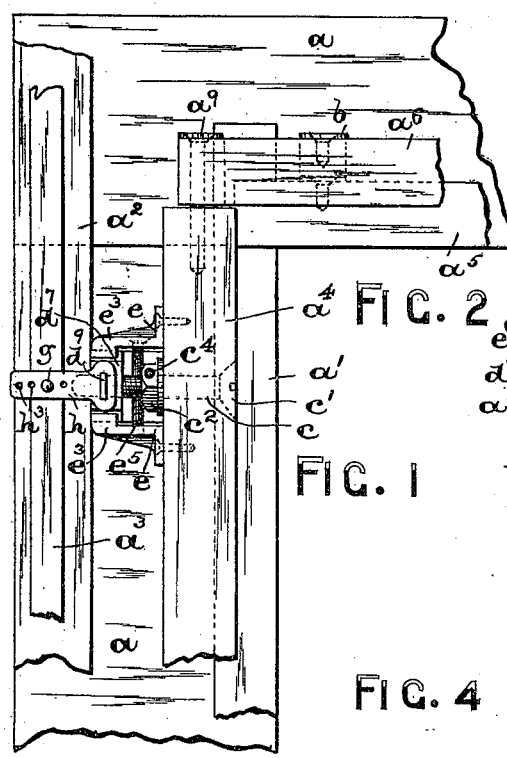
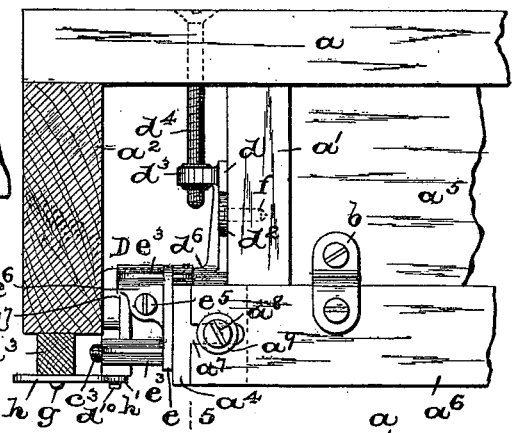
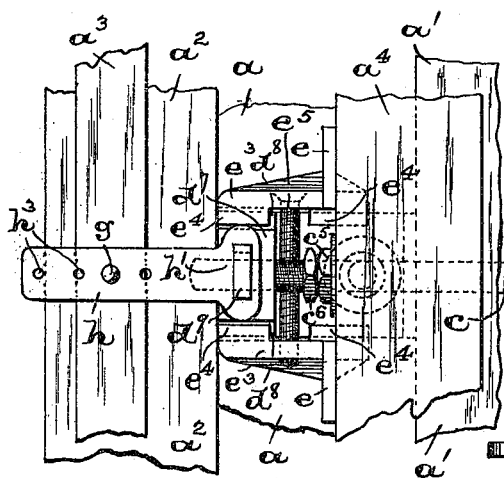
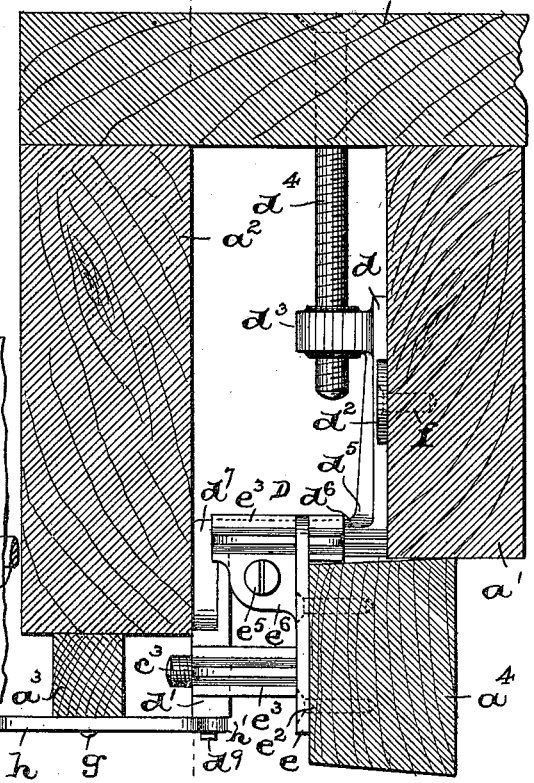
WITNESSES:
Edgar W. Joithe
Marcy Z. Trusdell
INVENTOR:
SAMUEL S. COLT,
BY
Fred L. Fraentzel.
ATTORNEY No. 641,842. Patented Jan. 23, 1900.
S. S. COLT.
DOOR.
(Application filed Aug. 5, 1899.)
(No Model.) 3 Sheets—Sheet 2.
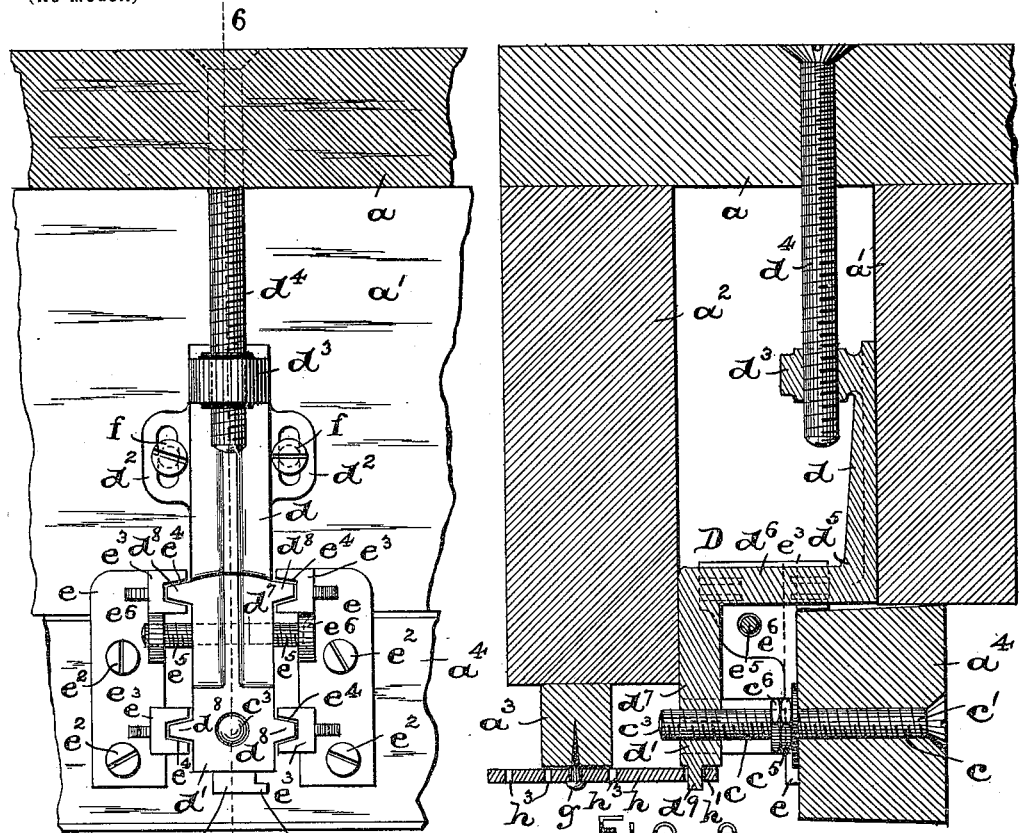
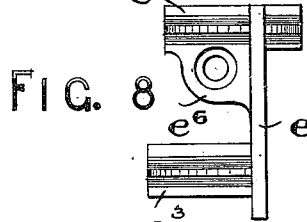
FIG. 8
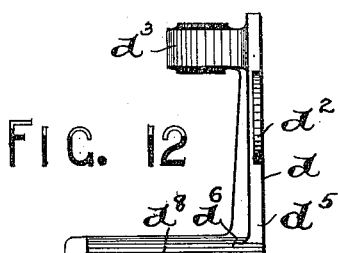
FIG. 12
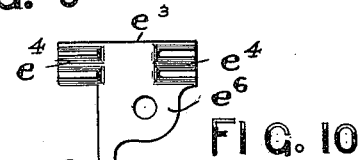
FIG. 10
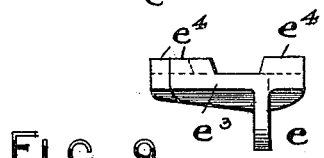
FIG. 9
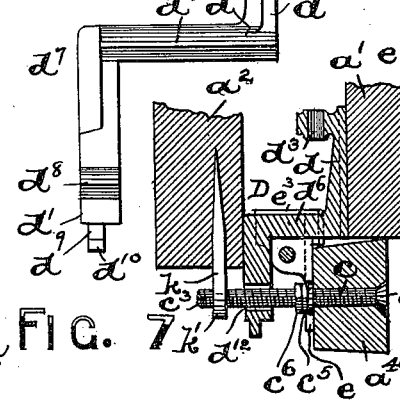
FIG. 11
FIG. 7
WITNESSES:
Edgar W. Joithe
Marcy K. Trusdell
INVENTOR:
SAMUEL S. COLT,
BY Fred K. Fraentzel,
ATTORNEY
THE NORRIS PETERS CO., PHOTO-LITHO., WASHINGTON, D. C.

No. 641,842. Patented Jan. 23, 1900.
S. S. COLT.
DOOR.
(Application filed Aug. 5, 1899.)
(No Model.) 3 Sheets—Sheet 3.

WITNESSES:
Edgar W. Joithe
Marcy J. Trusdell

INVENTOR:
SAMUEL S. COLT,
BY
Fred C. Fraentzel,
ATTORNEY

United States Patent Office.

SAMUEL S. COLT, OF ORANGE, NEW JERSEY.

DOOR.

SPECIFICATION forming part of Letters Patent No. 641,842, dated January 23, 1900.

Application filed August 5, 1899. Serial No. 726,246. (No model.)

*To all whom it may concern:*

Be it known that I, SAMUEL S. COLT, a citizen of the United States, residing at Orange, in the county of Essex and State of New Jersey, have invented certain new and useful Improvements in Doors; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in doors and door-jambs; and the invention has for its primary objects to provide a novel arrangement and construction of mechanism to be connected with the rabbet-strip and other parts of the door-casing, to provide an adjustable rabbet-strip which is movable to or from the edge of the door, to decrease the joint between the edge of the door and the strip and take up any shrinkage of the wood, and to prevent the admission of cold air, wind, &c., through the enlarged crevice formed by such shrinkage of the wood of either the door or door-frame.

A further and important object of this invention is to provide an adjusting mechanism which is secured in the rabbet-strip and has its free end operatively connected with a fixed piece secured to the stationary framework of the door-frame, and, furthermore, to provide, in connection with an adjusting mechanism for movably connecting the rabbet-strip with the door-frame, means which will act as a guide or retainer to maintain at all times the proper relative positions between the rabbet-strip and the door-jamb and to prevent any distortion of the rabbet-strip, especially when the door is hung directly to the adjustable rabbet-strip.

Finally, another object is to provide a simple and operative construction of mechanism for adjusting the rabbet-strip and retaining the same in its relative position with the door-jamb and other parts of the door-frame and to produce a perfect and better-fitting frame around the edge of the door, all of which will be fully set forth in the following specification.

My present invention therefore consists in the novel construction of an adjusting mechanism secured in the rabbet-strip, having its free end in operation with a fixed piece secured to the stationary framework, preferably in the form of an adjusting-screw held in a rotative but longitudinally in a fixed or stationary position in the rabbet-strip.

My invention consists, further, in the novel arrangement and construction of a retaining means or guide-piece to be secured in position, preferably, upon the rabbet-strip and coöperating with a bracket or supporting-arm, said parts being arranged and constructed to maintain after the adjustment of the rabbet-strip the proper relative positions between the rabbet-strip and the door-jamb and other parts of the door-frame and prevent any distortion of the rabbet-strip.

My invention consists, furthermore, in the novel arrangements and combinations of these various parts, whether taken singly or collectively, all of which will be hereinafter fully described and finally embodied in the clauses of the claim.

The invention is clearly illustrated in the accompanying drawings, in which—

Figure 14:
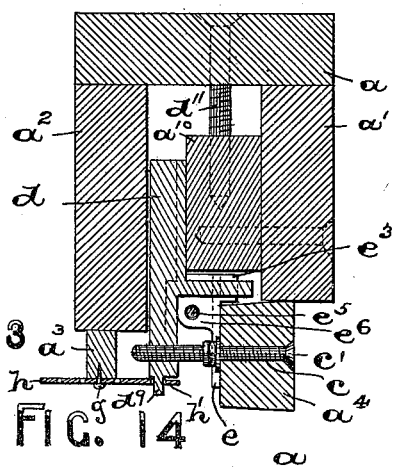
Figure 15:
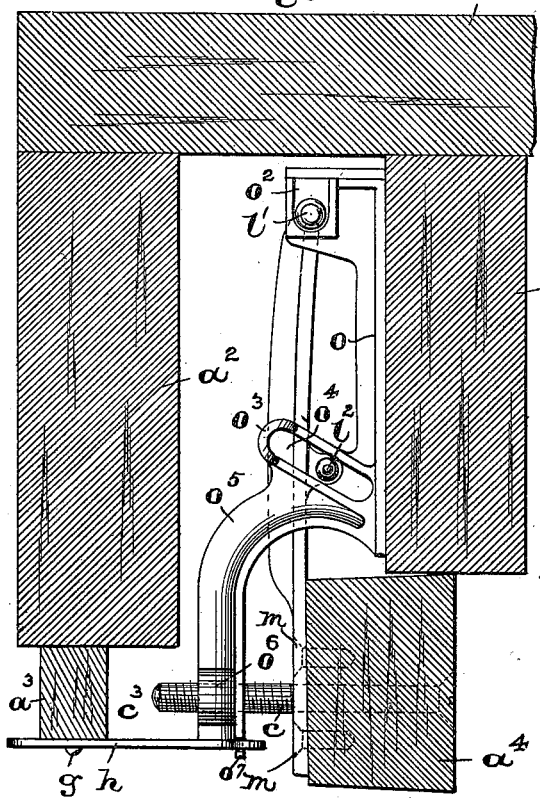
Figure 16:
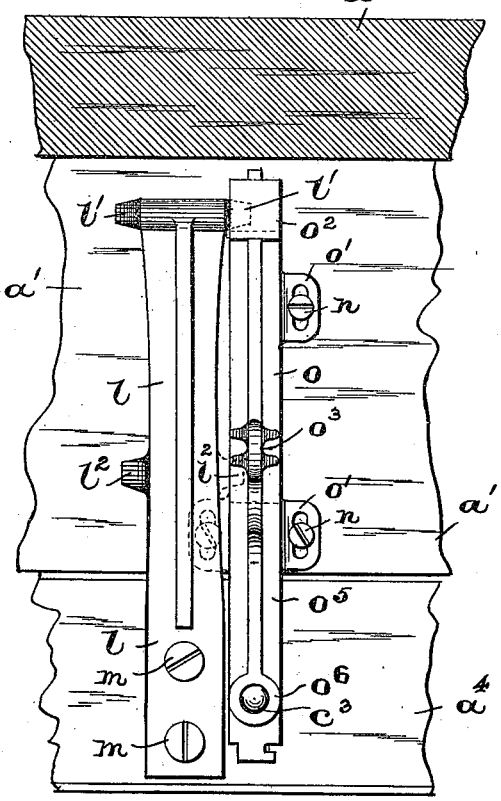

Figure 1 is a front elevation of one portion of a door-frame and adjustable rabbet-strip, illustrating one arrangement of the operating mechanism for adjustably securing the rabbet-strip in its operative position and also one arrangement of adjustable head-jamb that may be employed in connection therewith; and Fig. 2 is a top view of the said parts represented in Fig. 1, but the stud and ground secured thereto being represented in cross-section. Fig. 3 is an end view of the mechanism and parts with which it is operatively connected, all being made on an enlarged scale; and Fig. 4 is a side view of the several parts of the mechanism in their operative positions, but the several parts of the door-frame and adjustable rabbet-strip being represented in horizontal section. Fig. 5 is a vertical section taken on line 5 5 in Fig. 4, illustrating in top or plan view the general arrangement of the mechanism; and Fig. 6 is a vertical section taken on line 6 6 in said Fig. 5. Fig. 7 is a sectional view of a slightly-modified form of construction, illustrating another arrangement of operatively connecting the free end of an adjusting-screw connected with the mechanism with a fixed piece secured to the stationary framework. Fig. 8 is an outer face view, Fig. 9 a top edge view, Fig. 10 an inner face view, and Fig. 11 a rear view, of one of the retaining means or guides for maintaining the proper relative positions between the rabbet-strip and door-frame after adjustment of the said rabbet-strip. Fig. 12 is a side view of an arm or bracket employed in connection with the adjusting mechanism. Fig. 13 is a face view of a slightly-modified form of adjusting mechanism and the rabbet-strip and parts of door-frame with which it is operatively connected, and Fig. 14 is a vertical section of the said parts. Fig. 15 is a side elevation of still another modified form of adjusting mechanism, but still embodying the principal features of my present invention; and Fig. 16 is a top view of the same.

Similar letters of reference are employed in all of the said above-described views to indicate corresponding parts.

In said drawings $a$ and $a'$ indicate certain portions of the stationary framework of the door-casing, the part $a'$ forming the door-jamb, $a^2$ the usual stud to which the door-casing is secured, and $a^3$ is a strip of wood or the like which is suitably secured to said stud and is known by the trade as a "ground." The rabbet-strip is indicated by the reference-letter $a^4$.

The upper or head jamb of the door-frame, as will be seen from Figs. 1 and 2 of the drawings, is indicated by the reference-letter $a^5$ and has secured thereto by means of any well-known construction of bracket $b$ or other suitable fastening means a strip $a^6$, the end of which is preferably slotted, as at $a^7$, and by means of a screw $a^8$ and washer $a^9$, which is screwed into the end of the rabbet-strip $a^4$, the latter can be slidably connected with said strip $a^6$, as will be clearly evident.

The mechanism for moving or adjusting the rabbet-strip $a^4$ consists, essentially, of a suitable screw or bolt $c$, preferably provided with a slotted or grooved head $c'$ for the reception of a screw-driver or other similar tool, the said head being preferably countersunk in the face of the rabbet-strip and being rotatively arranged in a hole in said strip, substantially as illustrated in the several figures of the drawings. The said screw or bolt $c$ is rotatively arranged in said hole of the rabbet-strip, but is retained in a fixed position longitudinally by the arrangement of a nut $c^2$, which is screwed upon the screw end $c^3$ of the screw or bolt $c$ directly against the inner surface of the said rabbet-strip $a^4$, where it is held or locked in position by means of a pin or screw $c^4$, substantially as illustrated in Fig. 1 of the drawings, to prevent any longitudinal displacement of said screw or bolt when the same is turned for the adjustment of the rabbet-strip. In lieu of the nut $c^2$ and the pin or screw $c^4$ I may employ a nut $c^5$ and a lock or jam nut $c^6$, which are arranged upon the screw end of the screw or bolt $c$ in the manner represented in Figs. 3, 6, 7, and 14; but of course it will be understood that I may employ any other construction of holding or locking means in connection with the said bolt or screw to prevent its longitudinal displacement in the rabbet-strip but still permit of a rotative movement of the same. The screw $c^3$ of the said screw or bolt $c$ is operatively arranged in a screw-threaded boss or end $d'$ of a suitably-constructed bracket D, as more especially illustrated in Fig. 6. The said bracket D is usually made with a base-plate $d$, which is secured to the inner face of the door-jamb $a'$, preferably by means of screws $f$, which are passed through slotted ears or lugs $d^2$, by means of which the said bracket can be slidably secured in position upon said door-jamb surface and can be brought into proper relative position with the other parts of the mechanism secured upon the rabbet-strip by means of an adjusting-screw $d^4$, arranged in the frame-piece $a$ and having its screw-threaded end working in a screw-threaded boss $d^3$ on said plate $d$ of the bracket D, substantially as illustrated. It will, however, be understood that I may employ any other suitable means for such adjustment of the bracket, or I may entirely dispense with such adjusting means. The opposite end portion $d^5$ of said base-plate $d$ of the bracket D is provided with an upwardly-extending arm $d^6$, which in turn is provided with a forwardly-extending arm $d^7$, formed with the said screw-threaded boss or opening $d'$, hereinabove mentioned, and which is for the reception of the screw end $c^3$ of the said screw or bolt $c$. Thus it will be seen from an inspection more especially of Fig. 6 that when the said screw or bolt $c$ is turned in either direction the screw end $c^3$ of said screw or bolt will rotate in said screw-boss $d'$ of the bracket D, thereby bringing the rabbet-strip $a^4$ either closer to or farther away from the said arm $d^7$ while sliding along the edge of the door-jamb $a'$ to produce a proper rabbet for the edge of the door, as will be clearly understood. If desired, in order that the bracket D may be more rigidly connected with the said piece $a'$ and the stud $a^2$ of the stationary framework there may be formed on the end of the arm $d^7$ a stud $d^9$, preferably provided with a suitably-constructed teat or lug $d^{10}$, over which can be placed the open end $h'$ of a connecting-arm $h$, substantially as illustrated, said arm $h$ being provided with holes or perforations $h^2$, through which can be passed a nail or screw $g$, for securing said end of the arm to the ground $a^3$. This arrangement of connecting-arm $h$ helps to prevent any strain being brought upon the arm $d^7$ when there is any undue weight upon the rabbet-strip $a^4$; but of course it will be evident that said arm $h$ may be dispensed with, if found desirable. After adjustment of the rabbet-strip $a^4$ by means of said screw or bolt $c$ and bracket D in order that the said strip may retain its proper relative position with the stationary framework and to prevent any distortion of the various parts which might prevent proper adjustment, I have secured upon the said rabbet-strip $a^4$ a means for retaining said parts in their relative positions. Said means consists, essentially, of a pair of plates $e$, having screw-holes $e'$, (see Fig. 11,) through which can be passed suitable screws or pins $e^2$ for securing two of said plates $c$ in position upon the rabbet-strip $a^4$, as clearly illustrated in Fig. 5. Each plate $e$ has a pair of upwardly-extending guiding-arms $e^3$, provided with the grooved portions $e^4$, which are preferably made \\_/ shape in cross-section and into which are fitted certain wedge-shaped ribs or projections $d^8$ upon opposite sides of the arm $d^7$ of the bracket D. When these parts are properly fitted together, a screw $e^5$, operatively connected with certain web-like portions or flanges $e^6$ of the said plates $e$, is tightly screwed up, whereby the said grooved portions of the guide-arms $e^3$ will be firmly and operatively brought in engagement with the ribs or projections $d^8$ and will act as a retaining means to more rigidly secure the rabbet-strip in its proper relative position with the other parts of the stationary framework of the door-casing, but will still permit of its adjustment when the screw or bolt $c$ is turned.

Instead of the form of bracket D employed in connection with the parts represented in Figs. 1 to 6, inclusive, the bracket may be made as indicated in Figs. 13 and 14. In this construction I dispense with the arm $d^6$, which forms a part of the bracket, and I form the arm $d^7$ continuous with the base-plate $d$, the said plate $d$ being secured directly upon a wooden strip $a^{10}$, substantially as shown. In place of the screw $d^4$ for the adjustment of the bracket I screw into said strip $a^{10}$, which is secured to the jamb $a'$ in any suitable manner, an ordinary wood-screw $d^{11}$, said screw being passed through the part $a$ of the framework in the manner of the said screw $d^4$. In all other respects the arrangement and operation of the mechanism are similar to those described in connection with the construction represented in said Figs. 1 to 6, inclusive.

In some cases, as will be seen from Fig. 7, I may dispense with the screw-threaded boss $d'$, connected with the arm $d^7$ of the bracket D, and the screw end $c^3$ of the screw or bolt $c$ may be passed directly through an opening $d^{12}$ in said arm $d^7$ and then screwed into a screw-eye $k'$ of a pin $k$, which is driven into a strip $a^3$ commonly known in the trade as a "ground" or directly into the stud $a^2$, as clearly illustrated. The arrangement and operation of the remaining parts of the adjusting and retaining mechanism will be clearly understood from an inspection of said Fig. 7.

In Figs. 15 and 16 I have illustrated another modified form of adjusting mechanism for movably connecting the rabbet-strip to the framework of the door-casing, said mechanism being made according to the principles of this invention. In this construction I have secured to the rabbet-strip $a^4$ by means of screws $m$ an arm $l$, which is provided at the back with pintle-shaped ends $l'$ and has a second pair of pintle-shaped portions $l^2$. Upon the inner surface of the door-jamb $a'$ I have secured by means of screws $n$ in the slotted ears or lugs $o'$ a bracket $o$. Said bracket is provided at the rear end with a slotted box $o^2$, into which is fitted one of the pintle-shaped ends $l'$, and has a portion $o^3$, in which there is an elongated opening $o^4$ for the reception of one of the pintle-shaped portions $l^2$, said parts being arranged substantially in the manner illustrated in Fig. 15. The said bracket $o$ is provided with a forwardly-extending arm $o^5$, which is provided with a screw-threaded hub $o^6$ for the reception of the screw end $c^3$ of the bolt or screw $c$. Said arm $o^5$ may also have a lug or stud $o^7$, similar in construction to the lug or stud $d^9$, with which may be connected the rod or arm $h$ to be secured to the ground $a^3$. The said slotted box $o^2$ and the portion $o^3$ act in the same manner as the grooved guide-arms $e^4$ of the plates $e$, and the pintle-shaped portions of the bracket $l$ are the equivalent of the wedge-shaped guides or ribs $d^8$ of the bracket D. Thus it will be seen that when the parts are secured in position upon the rabbet-strip and stationary framework, respectively, the bracket $o$, owing to the coöperation of its parts $o^2$ and $o^3$ with the pintle-shaped portions of the bracket $l$, will cause the proper relative position of the rabbet-strip with the door-jamb, and will prevent any distortion of said rabbet-strip.

From the above description and an inspection of the drawings it will be evident that I have produced a simply-constructed mechanism which is practical for all the purposes of the present invention and which can be employed in connection with the various kinds of door-casings and doors.

I am fully aware that many changes may be made in the several arrangements and combinations of the various parts which may be used either singly or collectively without departing from the scope of my present invention. Hence I do not limit my invention to the exact arrangements and combinations of the several parts as herein described and illustrated, nor do I confine myself to the precise details of the construction of such parts. It will also be evident that the door may be hung directly to the adjustable rabbet-strip, whereby when the latter is adjusted both the said strip and door will be moved together in a direction toward the rabbet-strip on the opposite side of the door-casing and whereby the edge of the door and the rabbet-strip and door-jamb on said side will produce the proper joint to prevent the admission of cold and wind.

Having thus described my invention, what I claim is—

1. The combination, with a stationary frame, door-casing, and door-jamb, of a rabbet-strip arranged to slide laterally across the said door-jamb, and an adjusting mechanism secured in said rabbet-strip for adjusting the same in a direction toward or from the door, said mechanism having an operative connection with a fixed piece secured to said stationary frame, and an adjusting means between the stationary frame and said rabbet-strip-adjusting mechanism, substantially as and for the purposes set forth.

2. The combination, with a stationary frame, door-casing, and door-jamb, of a rabbet-strip arranged to slide laterally across the said door-jamb, and an adjusting-screw in said rabbet-strip, means on said screw arranged to retain said screw in a fixed position and prevent a longitudinal movement of the same, and an operative connection between the free end of said screw and stationary framework, whereby said rabbet-strip is adjustable in a direction toward or from the door, and an adjusting means between the stationary frame and the operative connection connected with the free end of said screw, substantially as and for the purposes set forth.

3. The combination, with a stationary frame, door-casing, and door-jamb, of a rabbet-strip arranged to slide laterally across the said door-jamb and adjustable in a direction toward or from the door, and mechanism arranged to coöperate with said rabbet-strip to retain said rabbet-strip in its proper relative position to said door-jamb and prevent distortion of the rabbet-strip, and an adjusting means between the stationary frame and said rabbet-strip-adjusting mechanism, substantially as and for the purposes set forth.

4. The combination, with a stationary frame, door-casing, and door-jamb, of a rabbet-strip arranged to slide laterally across the said door-jamb, and adjustable in a direction toward or from the door, and a bracket secured to said framework arranged to coöperate with said rabbet-strip to retain said rabbet-strip in a fixed angular position to said door-jamb and prevent distortion of the rabbet-strip, and a means of adjustment between said bracket and rabbet-strip, substantially as and for the purposes set forth.

5. The combination, with a stationary frame, door-casing, and door-jamb, of a rabbet-strip arranged to slide laterally across the said door-jamb and adjustable in a direction toward or from the door, and mechanism arranged to coöperate with said rabbet-strip to retain said rabbet-strip in its proper relative position to said door-jamb and prevent distortion of the rabbet-strip, consisting of a bracket secured to said door-jamb, and ribs or guides on said bracket, and retaining-plates secured on said rabbet-strip, guiding portions connected with said plates, with which said ribs are slidably connected, substantially as and for the purposes set forth.

6. The combination, with a stationary frame, door-casing, and door-jamb, of a rabbet-strip arranged to slide laterally across the said door-jamb and adjustable in a direction toward or from the door, and mechanism arranged to coöperate with said rabbet-strip to retain said rabbet-strip in its proper relative position to said door-jamb and prevent distortion of the rabbet-strip, consisting, essentially, of a bracket secured to said door-jamb, and ribs on said bracket, a pair of retaining-plates $e$ secured on said rabbet-strip, grooved guiding portions on said plates $e$, with which said ribs are slidably connected, web-like portions or flanges $e^6$ connected with said plates, and a tightening-screw operatively connected with said flanges, substantially as and for the purposes set forth.

7. The combination, with a stationary frame, door-casing, and door-jamb, of a rabbet-strip arranged to slide laterally across the said door-jamb and adjustable in a direction toward or from the door, a rotative means of adjustment connected with said rabbet-strip, and mechanism arranged to coöperate with said rabbet-strip to retain said rabbet-strip in its proper relative position to said door-jamb and prevent distortion of the rabbet-strip, consisting of a pair of guide-plates having guiding portions, and an operative connection between said plates, for adjustment of said guiding portions, substantially as and for the purposes set forth.

8. The combination, with a stationary frame, door-casing, and door-jamb, of a rabbet-strip arranged to slide laterally across the said door-jamb and adjustable in a direction toward or from the door, a rotative means of adjustment connected with said rabbet-strip, and mechanism arranged to coöperate with said rabbet-strip to retain said rabbet-strip in its proper relative position to said door-jamb and prevent distortion of the rabbet-strip, consisting, essentially, of a bracket, and a guide-plate having guiding portions with which said bracket is slidably connected, and an adjusting means between said stationary frame and said bracket, substantially as and for the purposes set forth.

9. The combination, with a stationary frame, door-casing, and door-jamb, of a rabbet-strip arranged to slide laterally across the said door-jamb and adjustable in a direction toward or from the door, a rotative means of adjustment connected with said rabbet-strip, and mechanism arranged to coöperate with said rabbet-strip to retain said rabbet-strip in its proper relative position to said door-jamb and prevent distortion of the rabbet-strip, consisting, essentially, of a bracket secured to said door-jamb, and ribs on said bracket, a pair of retaining-plates secured on said rabbet-strip, and grooved guiding portions connected with said plates, with which said ribs are slidably connected, and an adjusting means between said stationary frame and said bracket, substantially as and for the purposes set forth.

10. The combination, with a stationary frame, door-casing, and door-jamb, of a rabbet-strip arranged to slide laterally across the said door-jamb and adjustable in a direction toward or from the edge of the door in the same plane in which the door is hung when closed against the rabbets of the door-casing, a rotative means of adjustment connected with said rabbet-strip, and mechanism arranged to coöperate with said rabbet-strip to retain said rabbet-strip in its proper relative position to said door-jamb and prevent distortion of the rabbet-strip, consisting, essentially, of a bracket secured to said door-jamb, and ribs on said bracket, a pair of retaining-plates $e$ secured on said rabbet-strip, grooved guiding portions on said plates $e$, with which said ribs are slidably connected, web-like portions or flanges $e^6$ connected with said plates, and a tightening-screw operatively connected with said flanges, substantially as and for the purposes set forth.

11. The combination, with a stationary frame, door-casing, and door-jamb, of a rabbet-strip arranged to slide laterally across the said door-jamb and adjustable in a direction toward or from the edge of the door in the same plane in which the door is hung when closed against the rabbets of the door-casing, mechanism arranged to coöperate with said rabbet-strip to retain said rabbet-strip in its proper relative position to said door-jamb and prevent distortion of said rabbet-strip, and an adjusting-screw in said rabbet-strip having its free end operatively connected with said retaining mechanism, substantially as and for the purposes set forth.

12. The combination, with a stationary frame, door-casing, and door-jamb, of a rabbet-strip arranged to slide laterally across the said door-jamb and adjustable in a direction toward or from the edge of the door in the same plane in which the door is hung when closed against the rabbets of the door-casing, mechanism arranged to coöperate with said rabbet-strip to retain said rabbet-strip in its proper relative position to said door-jamb and prevent distortion of said rabbet-strip, consisting, essentially, of a bracket, and a guide-plate having guiding portions with which said bracket is slidably connected, and an adjusting-screw in said rabbet-strip having its free end operatively connected with said bracket, substantially as and for the purposes set forth.

13. The combination, with a stationary frame, door-casing, and door-jamb, of a rabbet-strip arranged to slide laterally across the said door-jamb and adjustable in a direction toward or from the edge of the door in the same plane in which the door is hung when closed against the rabbets of the door-casing, mechanism arranged to coöperate with said rabbet-strip to retain said rabbet-strip in its proper relative position to said door-jamb and prevent distortion of said rabbet-strip, consisting, essentially, of a bracket secured to said door-jamb, and ribs on said bracket, a pair of retaining-plates secured on said rabbet-strip, grooved guiding portions connected with said plates, with which said ribs are slidably connected, and an adjusting-screw in said rabbet-strip, having its free end operatively connected with said bracket, substantially as and for the purposes set forth.

14. The combination, with a stationary frame, a ground connected with said frame, door-casing, and door-jamb, of a rabbet-strip, arranged to slide laterally across the door-jamb, mechanism arranged to coöperate with said rabbet-strip to retain said rabbet-strip in its proper relative position to said door-jamb and prevent distortion of the rabbet-strip, and a rigid connection between said rabbet-strip mechanism and said ground, substantially as and for the purposes set forth.

15. The combination, with a stationary frame, a ground connected with said frame, door-casing, and door-jamb, of a rabbet-strip, arranged to slide laterally across the door-jamb, mechanism arranged to coöperate with said rabbet-strip to retain said rabbet-strip in its proper relative position to said door-jamb and prevent distortion of the rabbet-strip, and a rigid connection between said rabbet-strip mechanism and said ground, consisting, essentially, of a stud $d^9$ of said mechanism, a nail or screw $g$ in said ground, and a connecting-arm $h$ between said stud and nail or screw, substantially as and for the purposes set forth.

In testimony that I claim the invention set forth above I have hereunto set my hand this 3d day of August, 1899.

SAMUEL S. COLT.

Witnesses:
FREDK. C. FRAENTZEL,
MAECY Z. TRUSDELL.